United States Patent [19]

Augustine et al.

[11] Patent Number: 5,502,019

[45] Date of Patent: *Mar. 26, 1996

[54] CONVERSION OF CARBON MONOXIDE USING COBALT-BASED METAL OXIDE CATALYSTS

[75] Inventors: Robert L. Augustine, Livingston, N.J.; Jay A. Fournier, Richmond, Va.; John B. Paine, III, Midlothian, Va.; Kenneth H. Shafer, Midlothian, Va.; Setrak K. Tanielyan, South Orange, N.J.

[*] Notice: the term of this patent shall not extend beyond the expiration date of Pat. No. 5,258,340.

[73] Assignee: Philip Morris Incorporated, New York, N.Y.

[21] Appl. No.: 275,245

[22] Filed: Jul. 15, 1994

[51] Int. Cl.$^6$ ............................ B01J 23/72; B01J 23/80
[52] U.S. Cl. ............................ 502/314; 502/60; 502/183; 502/184; 502/185; 502/242; 502/244; 502/313; 502/325; 502/326; 502/329; 502/330; 502/331; 502/337; 502/338
[58] Field of Search ............................ 502/326, 325, 502/327, 74; 423/212, 213.2, 213.5

[56] References Cited

U.S. PATENT DOCUMENTS

| | | |
|---|---|---|
| 3,842,158 | 10/1974 | Hansford . |
| 3,893,949 | 7/1975 | Sakai et al. . |
| 3,903,242 | 9/1975 | Meissner et al. . |
| 3,909,455 | 9/1975 | Rainer et al. . |
| 3,928,238 | 12/1975 | Koberstein et al. . |
| 4,034,060 | 7/1977 | Koberstein et al. . |
| 4,116,884 | 9/1978 | Hayashi et al. . |
| 4,228,138 | 10/1980 | Sermon . |
| 4,491,637 | 1/1985 | Hartig et al. . |
| 4,977,126 | 12/1990 | Mauldin et al. . |
| 5,258,340 | 11/1993 | Augustine et al. . |

FOREIGN PATENT DOCUMENTS

| | | |
|---|---|---|
| 50-36387 | 3/1975 | Japan . |
| 2221852 | 2/1990 | United Kingdom . |

OTHER PUBLICATIONS

Haruta et al., Journal of Catalysis, vol. 115, pp. 301–309, (1989).
CA: 110(16)140731d, "Oxidation catalysts for combustible gases", 1989.
CA: 93(6)54804d, "The effect of cobalt ion dispersion on the oxidation of carbon monoxide catalyzed by cobalt(II) oxide–magnesium oxide solid solutions", 1980.
CA: 92(10)83321d, "Catalyst for oxidizing carbon monoxide", 1980.
CA: 91(12)97330x, "Catalytic oxidation of carbon monoxide on cobalt (II) oxide–magnesium oxide solid solutions", 1980.
CA: 87(10)72764w, "Catalysts for elimination of gaseous contaminants", 1977.
CA: 78(24)151060f "Catalysts for the purification of gases", 1973.
CA: 78(10)62873f, "Catalysts for carbon monoxide oxidation", 1973.
CA: 119(18)189385u, "Highly active supported cobalt oxide catalysts prepared by low temperature oxygen plasma", 1993.
CA: 116(14)137018v, "Effect of calcination temperature and chemical composition on catalytic activity of cobalt oxide ($CO_3O_4$) supported on gamma–alumina", 1992.
CA: 112(8)63740t, "Effect of calcination temperature and chemical composition on catalytic activity of cobalt oxide ($CO_3O_4$) supported on gamma–alumina", 1990.
CA: 109(8)62018q, "Effects of thermal treatment on the catalytic properties of lanthanum cobalt oxide ($LaCoO_3$) and lanthanum strontium cobalt oxide ($La_{0.8}Sr_{0.2}CoO_3$)", 1988.
CA: 107(26)243614k, "Effect of thermal treatments on the catalytic properties of lanthanum strontium cobalt oxide ($La_{0.8}Sr_{0.2}CoO_3$)", 1987).
CA: 93(14)138476m, "A study of the influence of thermal treatment of the catalyst on the catalytic oxidation of carbon monoxide on cobaltic oxide ($Co_3O_4$)", 1980.
CA: 115(18)190769w, "Determination of the active surface of supported copper cobalt spinel catalysts by measuring their reduction rate", 1991.
CA: 111(16)141484h, "Catalytic properties and surface states of perovskite–type mixed oxides", 1989.
CA: 108(14)118081d, "Activity of copper–cobalt–chromium spinel catalysts for the complete oxidation of hydrocarbons and carbon monoxide", 1988.
CA: 108(10)82683k, "Structure and properties of perovskite–type materials in catalysis—$La_{k-x}Sr_xCo_{0.75}M_{0.25}O_{3-\delta}\square\delta$ series", 1988.
CA: 107(26)243636u, "Physicochemical and catalytic properties of binary oxides with the perovskite–type structure", 1987.
CA: 105(18)159478v, "Effect of a reaction medium on activity of a cobalt–chromium spinel catalyst in oxidation of carbon monoxide", 1986).
CA: 104(10)75885s, "On the nature of active species in the oxidation of carbon monoxide on $LcCoO_3$ type perovskites", 1986.
CA: 102(24)208591a, "Catalytic oxidation of carbon monoxide on lanthanum strontium cobalt oxide ($La_{0.5}Sr_{0.5}CoO_3$) perovskite oxide", 1985.
CA: 101(10)78043q, "Oxidation of carbon monoxide on perovskite cobaltites $Ln_{1-x}M_xCoO_3$ (Ln=La, Sm; M=Ba, Pb and Th)", 1984.

(List continued on next page.)

*Primary Examiner*—Asok Pal
*Attorney, Agent, or Firm*—Burns, Doane, Swecker & Mathis

[57] ABSTRACT

Provided are improved catalyst compositions for use in oxidizing carbon monoxide and methods of preparing these catalysts. The catalyst compositions are particularly useful at ambient temperatures. The catalyst compositions, prepared by a coprecipitation method, comprise an oxide of cobalt as the principal component with one or more metals selected from the group consisting of manganese (Mn), aluminum (Al), bismuth (Bi), cerium (Ce), chromium (Cr), copper (Cu), iron (Fe), lanthanum (La), magnesium (Mg), titanium (Ti), zinc (Zn), and zirconium (Zr).

44 Claims, 9 Drawing Sheets

OTHER PUBLICATIONS

CA: 101(8)60899p, "Catalytic oxidation of carbon monoxide on lanthanide cobalt oxide (LnCoO3) perovskite type oxides", 1984.

CA: 101(8)60863x, "Catalytic activity of lanthanum cobalt perovskite oxides. Effect of preparation methods of catalyst", 1984.

CA: 101(2)12760q, "Freeze-drying method of preparing perovskite-like lanthanum cobalt oxide ($LaCoO_3$) catalyst", 1984.

CA: 99(20)164618c, "Catalytic oxidation of carbon monoxide on $LnCoO_3$ perovskite oxides", 1983.

CA: 97(24)203695f, "Rare earth catalysts of perovskite--type structure for catalytic oxidation. II. Catalytic properties of cobalt containing rare earth perovskite in oxidation of carbon monoxide", 1982.

CA: 84(20)140226n, "Catalytic composition with perovskite crystal structure", 1976.

CA: 113(20)177415s, "Lanthanum cobalt oxide oxidation catalysts derived from mixed hydroxide precursors", 1990.

CA: 110(16)142160r, "Valence control, reactivity of oxygen, and catalytic activity of lanthanum strontium cobalt oxide ($La_{2-x}Sr_xCoO_4$)", 1989.

CA: 108(10)82708x, "Catalytic properties and surface states of lanthanum thorium strontium cobalt oxides ($La_{1-x}(Th, Sr)_xCoO_3$)", 1988.

CA: 107(26)243660x, "catalytic oxidation of carbon monoxide on cobalt oxide supported on gamma–alumina", 1987.

CA: 86(24)178036e, "Preparation of cobalt oxide catalysts and their activity for carbon monoxide oxidation at low concentration", 1977.

CA: 70(4)13212r, "Catalysts for the oxidation of carbon monoxide contained in automobile exhaust", 1969.

CA: 82(6)35319f, "Preparation and properties of unsupported cobalt oxide catalysts", 1975.

*Journal of Catalysis* 47, 33–47 (1977), "Preparation of Cobalt Oxide Catalysts and Their Activity for CO Oxidation at Low Concentration", D. Pope, D. S. Walker and R. L. Moss.

Science/Technology, Feb. 24, 1994, C&EN, "Catalysis Gains Widening Role in Environmental Protection", Joseph Haggin, C&EN Chicago.

CONVERSION OF CARBON MONOXIDE USING COBALT-BASED METAL OXIDE CATALYSTS

FIELD OF THE INVENTION

This invention relates to improved catalysts for the oxidation of carbon monoxide and methods of preparing these catalysts. More particularly, the invention relates to mixed-metal oxide catalysts which promote the oxidation of carbon monoxide at or near room temperature.

BACKGROUND OF THE INVENTION

There have been previous attempts to provide catalysts containing certain metal oxides and mixed metal oxides alone and in combination with noble metals or their oxides for the oxidation of carbon monoxide to carbon dioxide. There have also been previous attempts to provide methods for the manufacture of such catalysts. These attempts have not produced catalysts having certain advantages as discussed below.

For example, GB 2 221 852A describes vehicle exhaust gas catalysts formed from mixed oxide compositions of tin(IV) oxide, $SnO_2$ and either or both of a cobalt oxide, preferably $Co_3O_4$, and manganese(IV) oxide, $MnO_2$. However, these catalysts show no activity for the oxidation of carbon monoxide at temperatures less than about 50° C., and exhibit maximum catalytic activity at temperatures above about 140° C. Moreover, the methodology taught in GB 2 221 852A includes final calcination of the catalyst at temperatures sufficiently high, e.g., 600° C., so as to deactivate the catalyst with respect to the lower oxidation temperatures desired for use of such catalysts.

U.S. Pat. No. 3,909,455 describes a catalyst for the oxidation of carbon monoxide at ambient conditions utilizing a high surface area alumina support containing less than about 15 weight percent cobalt deposited thereon. These catalysts were blue in color, thereby containing all of their cobalt exclusively in a tetrahedrally coordinated divalent form, $CoAl_2O_4$, a distinct crystalline phase. It was indicated that when the cobalt content of their catalyst exceeded 15 percent by weight the color of the product became black (containing cobalt in two oxidation states, II and III, i.e., $Co_3O_4$) and did not show catalytic activity.

Laid Open Patent Publication No. Sho 50/1975-36387 discloses a catalytic filter for air purification utilizing manganese oxide on a net-like structural body. Other oxides of copper, cobalt and silver may also be utilized in combination with at least 50 mole percent manganese oxide on the net-like structural body.

The search has continued for a catalyst active at lowered, e.g., ambient, temperatures substantially free of the disadvantages, defects and limitations of prior materials.

SUMMARY OF THE INVENTION

An object of the present invention is to provide a catalyst useful for oxidizing carbon monoxide at lowered, e.g., ambient, temperatures.

A further object of the present invention is to provide a process for the manufacture of catalysts useful for oxidizing carbon monoxide at lowered, e.g., ambient, temperatures.

A further object of the present invention is to provide a catalyst which effectively oxidizes carbon monoxide.

In accordance with the foregoing objectives, there is provided by one aspect of the present invention, a mixed metal oxide catalyst composition for use in oxidizing carbon monoxide, comprising an oxide of cobalt in a principal amount and lesser amounts of one or more metals selected from manganese, aluminum, bismuth, cerium, chromium, copper, iron, lanthanum, magnesium, titanium, zinc, and zirconium. The atomic ratio of cobalt to other metals may be from about 50:1 to about 2:1.

In another aspect of the present invention, a quaternary oxide catalyst composition for use in oxidizing carbon monoxide is provided, comprising an oxide of cobalt in a principal amount and lesser amounts of three metals selected from manganese, aluminum, bismuth, cerium, chromium, copper, iron, lanthanum, magnesium, titanium, zinc, and zirconium. The atomic ratio of cobalt to the other three metals may be from about 50:1 to about 2:1.

In another aspect of the present invention, a quaternary oxide catalyst composition for use in oxidizing carbon monoxide is provided, comprising an oxide of cobalt in a principal amount with lesser amounts of manganese and two metals selected from the group consisting of aluminum, bismuth, cerium, chromium, copper, iron, lanthanum, magnesium, titanium, zinc, and zirconium. The atomic ratio of cobalt to manganese may be from about 20:1 to about 5:1. The atomic ratio of cobalt to the other two metals may be from about 50:1 to about 5:1.

In accordance with another aspect of the present invention, a ternary oxide catalyst composition for use in oxidizing carbon monoxide is provided, comprising an oxide of cobalt in a principal amount and lesser amounts of two metals selected from manganese, aluminum, bismuth, cerium, chromium, copper, iron, lanthanum, magnesium, titanium, zinc and zirconium. The atomic ratio of cobalt to the other two metals may be from about 50:1 to about 2:1.

In accordance with another aspect of the present invention, a ternary oxide catalyst composition for use in oxidizing carbon monoxide is provided, comprising an oxide of cobalt in a principal amount with lesser amounts of manganese and one other metal selected from aluminum, bismuth, cerium, chromium, copper, iron, lanthanum, magnesium, titanium, zinc and zirconium. The gram-atom ratio of cobalt to manganese is from about 20:1 to about 5:1. The atomic ratio of cobalt to the other metal is from about 50:1 to about 5:1.

In accordance with another aspect of the present invention, a binary oxide catalyst composition for use in oxidizing carbon monoxide is provided, comprising an oxide of cobalt in a principal amount and lesser amounts of one metal selected from the group consisting of manganese, aluminum, bismuth, cerium, chromium, copper, iron, lanthanum, magnesium, titanium, zinc and zirconium. The atomic ratio of cobalt to the other metals may be from about 50:1 to about 2:1.

In accordance with another aspect of the present invention, there is provided a ternary or quaternary metal oxide catalyst composition for use in oxidizing carbon monoxide comprising an oxide of cobalt as the principal component and less than 40 mole percent of two or three metals selected from the group consisting of manganese, aluminum, bismuth, cerium, chromium, copper, iron, lanthanum, magnesium, titanium, zinc, and zirconium as a solid solution with the cobalt oxide and/or as a separate, yet intimate, oxide phase.

In another aspect of the present invention, there is provided a binary oxide catalyst composition for use in oxidizing carbon monoxide comprising an oxide of cobalt as the principal component and less than 30 mole percent of one metal selected from the group listed above.

In another aspect of the present invention, there are provided a series of binary, ternary or quaternary oxides, comprising cobalt as the principal component with manganese to the extent of up to 10–20 percent of the cobalt, either alone, or accompanied by one or more of the modifying elements selected from Al, Bi, Ce, Cr, Cu, Fe, La, Mg, Ti, Zn, and Zr. We find that manganese-containing cobalt compositions are especially resistant to deactivation by continued contact with carbon monoxide at ambient temperatures.

It is to be understood that not all compositions obtainable under the above parameters are equally active. Optimization is necessarily determined empirically. Those skilled in the art would doubtless be able to optimize these systems further, based on the guidelines herein provided.

In another aspect of the present invention, there is provided a method for producing any of the above binary, ternary or quaternary oxide catalyst compositions for use in oxidizing carbon monoxide comprising mixing a salt of cobalt with salts of one to three metals selected from the group consisting of Mn, Al, Bi, Ce, Cr, Cu, Fe, La, Mg, Ti, Zn, and Zr, in aqueous solution to form a mixture; coprecipitating the metal salts by adding the mixture to a base to form a precipitate; washing the precipitate; drying the washed precipitate; and calcining the dried precipitate at a temperature of about 150° C. to about 290° C.

The best catalysts of this invention are active in catalyzing the oxidation of carbon monoxide at relatively low temperatures, i.e., between about 25° C. and about 40° C. As the temperature increases carbon monoxide is oxidized even more rapidly to carbon dioxide.

The catalysts are useful for the catalytic conversion of carbon monoxide in various applications, such as devices used in the conversion of carbon monoxide from carbonaceous heat sources such as automobile exhaust conversion devices, and such as air-purifiers. Catalytic activity of base metal oxides have also been reported for the conversion of the volatile organic fraction of particulate exhaust emissions.

The catalyst compositions of the present invention can also be placed on a support, i.e., an inert material that does not enter the carbon monoxide conversion reaction, but rather facilitates that reaction by enhancing the sites at which those reactions take place.

These and other objects, aspects and advantages of the present invention will become apparent upon review of the following specification, the figures, and the claims appended thereto.

DETAILED DESCRIPTION OF THE PREFERRED EMBODIMENTS

Figure 1:
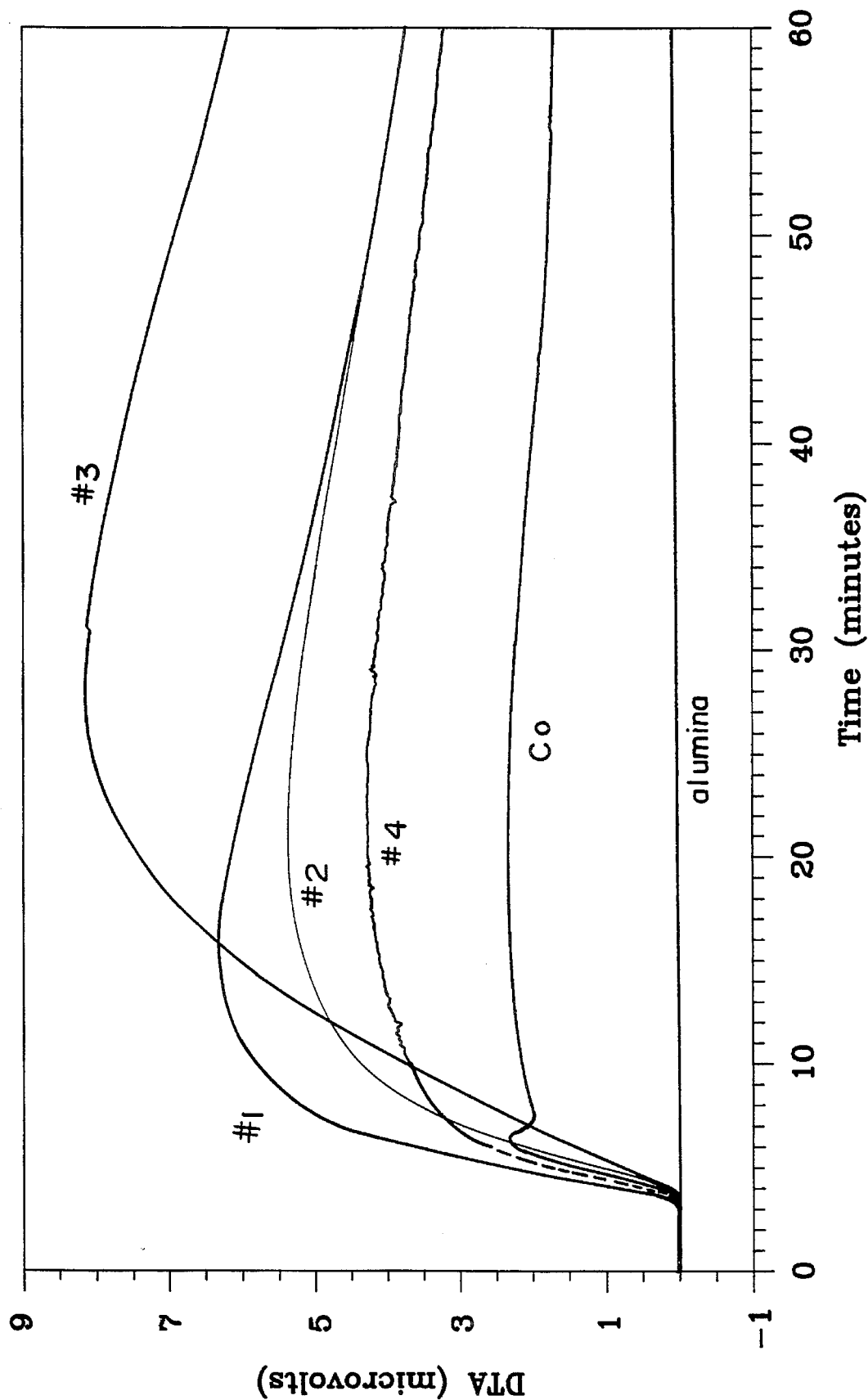
FIG. 1—Plot showing the ambient temperature CO oxidation activity in terms of DTA microvolts as a function of time for catalysts of Examples 1–4, Co oxide (Example 15), and alumina calcined at 206° C.

The novel catalysts of the present invention comprise an oxide of cobalt as the principal component with one or more metals selected from the group consisting of Mn, Al, Bi, Ce, Cr, Cu, Fe, La, Mg, Ti, Zn, or Zr. All catalysts were shown to be amorphous to x-rays and may or may not comprise a solid solution. It has been found that these catalysts may be utilized at lowered temperatures, e.g., room temperature, to efficiently oxidize carbon monoxide, provided that the discoveries relating to their preparation are adhered to. Thus, the catalysts of the present invention can be placed in any device which is used to remove carbon monoxide.

In one aspect, the catalysts are ternary or quaternary oxide compositions having an oxide of cobalt as the principal component and containing two or three additional metals selected from the group listed above.

In a further embodiment, a binary oxide catalyst of cobalt oxide and a metal selected from the group listed above is provided. This catalyst can be produced by the same procedures as the ternary and quaternary oxide catalysts described above.

In the most preferred embodiments, the oxides are comprised of cobalt and manganese, either alone, or admixed with one or more metals selected from the group consisting of Al, Bi, Ce, Cr, Cu, Fe, La, Mg, Ti, Zn, or Zr.

The catalysts of the present invention are preferably obtained by coprecipitation. Through the coprecipitation of the appropriate base-metal compounds followed by calcining, the catalysts of this invention were found to be up to eight times more active (under established room temperature TG/DTA/MS characterizational conditions) than pure cobalt oxide prepared by the same method.

Generally, an aqueous solution of a cobalt salt is mixed with aqueous solutions of salts of the other metals desired for the catalyst composition and the metals solution is coprecipitated by addition to an aqueous base solution. The precipitate obtained is then washed, dried, and calcined to obtain the catalyst product°

One of skill in the art will readily understand the sort of materials to be used for preparation of the catalysts of the present invention. The cobalt can be supplied as any soluble salt, but is preferably supplied as cobaltous nitrate [$Co(NO_3)_2 \cdot 6H_2O$]. The other metals can also be supplied as any soluble salt, but will preferably be supplied as nitrates, chlorides, sulfates, or acetates. The titanium can be provided as titanium oxalate or other soluble chelate. The metals will generally be combined in mole ratios of about 50:1 to about 2:1, preferably about 10:1 to about 5:2, cobalt to other metal or metals.

The base which is used for the coprecipitation of the metals solution can be any suitable base known to those of skill in the art. Preferably, the base is a carbonate, most preferably, sodium carbonate. Other non-limiting examples of suitable bases include potassium carbonate, perhaps also sodium or potassium bicarbonate especially if employed in admixture with the corresponding carbonates to raise the pH. Bases which might ligate or chelate the cobalt or other metals (e.g. ammonia or amines) or solubilize the cobalt (e.g. alkali metal hydroxides) are unsuitable. The precipitate, consisting of an admixture of various hydroxide, hydrous oxide, and basic carbonate species, is then washed, generally with water, taken in sufficient volume to ensure the removal of any chloride ion, if any chloride salts were employed in the preparation. The absence of chloride was determined by the use of silver nitrate on an aliquot of filtrate acidified with acetic acid to eliminate interference by soluble carbonates. A similar relative volume of wash water was employed for all of the other preparations, even for those systems where chloride ion was never present, such volume being the amount deemed adequate to ensure the removal of all soluble counterions (e.g. nitrate, carbonate, sodium). This washing procedure ensures the removal of soluble impurities that may adversely affect catalyst performance. The catalyst precursor then needs to be dried, perhaps sieved, and calcined at temperatures between about 150° C. to about 290° C., preferably 175° C. to 285° C.

The preferred solvent for these procedures is water. However, the use of other solvents, particularly aqueous mixtures, is not precluded. The primary criteria for the selection of the solvent is its capability to dissolve both metal salts and the base and yet not to dissolve the metal hydroxides/carbonates being produced for calcining.

The metal hydroxides/carbonates may be separated by any known method including filtration or centrifugation. Following this separation step, the precipitate is washed thoroughly. It is believed that the washing operation removes soluble salts and other impurities from the catalyst, which may otherwise hinder the activity of the catalyst. While water is an acceptable washing agent because of its low cost and availability, and distilled or deionized water is preferred, other suitable solvents may be employed.

After washing, the precipitate is dried, generally in an oven in air at a temperature between about 90° and 110° C. for about 6 to about 72 hours, preferably 12 to 24 hours. The dried precipitate may then be crushed and sieved, so as to provide the catalyst in a granular form. As will be apparent to those skilled in the art, the choice of sieve mesh sizes is dictated by consideration of the ultimate application to which the catalysts will be put. The resulting sieved material is then calcined to dehydrate and/or dissociate the metal hydroxides and/or carbonates to form the metal oxide catalysts of the present invention. The calcining step is carried out in an oxidizing atmosphere, preferably in a stream of pure oxygen, by heating to temperatures of about 150° C. to about 290° C., preferably about 175° C. to 285° C., for about 1 to 4 hours, preferably 2 to 3 hours. Heat may be applied uniformly throughout the calcination step or may be gradually increased until the appropriate temperature is reached. It was determined that above a temperature of about 300° C., the catalysts of the present invention began to lose activity at the preferred lower ambient temperatures. Therefore, in order to maximize catalytic activity, it is important that the calcination temperature be high enough to dehydrate and/or dissociate the mixed metal hydroxides and/or carbonates and low enough so as not to deactivate or decompose the active surface.

The nature of the solid particles of performed catalyst is dictated by the specific use for which the catalyst is to be utilized.

Typically, these catalysts are active at relatively low temperatures, i.e., between about 25° C. to about 40° C. As the temperature increases carbon monoxide is oxidized even more readily to carbon dioxide.

To varying degrees, the cobalt-containing catalysts of the present invention may be somewhat susceptible to inactivation by water. Catalysts which become substantially inactive when exposed to water vapor at room temperature, can be reactivated by heating.

In a particularly desirable embodiment, the catalysts of the present invention are used as vehicle exhaust gas catalysts to control the emissions of noxious gases, particularly carbon monoxide, but they also have utility in other fields where similar emission control is necessary.

It should also be pointed out that reference herein to the oxide catalysts of this invention refers to either a solid solution or an intimate mixture of the specified oxides typically obtained through a coprecipitation process followed by calcining. This is to be contrasted with other catalyst compositions prepared by using other methods, e.g., sequential precipitation processes, to obtain catalyst compositions in other forms such as layered metal oxides.

The invention will be illustrated in greater detail by the following specific examples. It is understood that these examples are given by way of illustration and are not meant to limit the disclosure or the claims to follow.

EXAMPLES

In the examples which follow, the ratios given refer to atomic ratios of the constituent metals, unless otherwise specified. It should be noted that all calcined catalysts were black in color indicating that cobalt was present in oxidation states of both II and III, i.e., $Co(II)Co(III)_2O_4$. The oxidation states of the other metals were assumed to be the most stable oxidized species, with multiple oxidation states possible. X-ray powder diffraction showed the catalysts to be amorphous. In most cases the ionic radii of the additive metals is comparable to that of $Co^{2+}$ and $Co^{3+}$ and should, therefore, form solid solutions.

Catalytic evaluation was conducted by utilizing either Thermogravimetric/Differential Thermal Analysis (TG/DTA) or Thermogravimetric/Differential Thermal Analysis/Mass Spectroscopy (TG/DTA/MS). A Seiko simultaneous TG/DTA 300 unit was used to evaluate catalytic activity by monitoring temperature changes of the catalyst versus a reference (DTA) during CO oxidation (an exothermic reaction) either under adiabatic ambient conditions or as a function of temperature. Sample fines (less than 40 mesh) were charged to an aluminum sample bucket, loaded onto the TG/DTA balance, and calcined by heating under a flow of oxygen to the desired temperature where it was held for two hours followed by cooling in the oxygen flow until a constant weight was obtained. A weight loss was always observed during the calcination step (dehydration of the hydrous oxides/hydroxides and decarboxylation of the basic carbonates). The TG/DTA balance was rezeroed and after a two-minute baseline was established under the oxygen flow, the gas was switched to a flow of a 4% CO/21% $O_2$/75% Ar gas mixture. Under adiabatic conditions the change in temperature of the catalyst versus an empty reference bucket (measured by a difference in microvolts of the reference and sample thermocouples; DTA) was monitored as a function of time. Any increase in DTA microvolts corresponded to an increase in sample temperature, and, therefore, catalytic activity. In order to monitor the evolution of $CO_2$ and correlate to DTA, a VG instruments quadrupole mass spectrometer (EGA300SL) was interfaced to the Seiko TG/DTA via a flexible fused silica-lined stainless steel capillary. The advantages of the this system were: 1) no modification to the Seiko balance was necessary since coupling was made using a Teflon ball joint directly to the end of the quartz furnace tube, and 2) the reported partial pressure of $CO_2$ (mass/charge ratio of 44) present in the quadrupole mass spectrometer ion source was proportional to that present in the atmospheric pressure gas sample taken from the TG/DTA furnace tube.

The oxidation of CO over different catalysts as a function of temperature was also studied, via DTA and $CO_2$ evolution, by heating the catalyst at 10° C./min in the TG/DTA unit after the catalyst had been run for forty-five minutes under ambient CO oxidation conditions.

Data were converted to ASCII files, and reduction performed in EXCEL on a separate PC. For comparative purposes, all data were normalized to 5 mg. An alumina sample run under the same conditions was used as a control.

Example 1

Preparation of Cobalt/Manganese (10:1) Oxide Catalyst Powder

Anhydrous sodium carbonate ($Na_2CO_3$, 472.53 g, 4.458 moles) was dissolved in water (3088.08 g). The resulting warm solution was allowed to cool overnight to ambient temperature (circa 25° C.).

Cobalt(II) nitrate hexahydrate ($Co(NO_3)_2.H_2O$, 305.89 g, 1.051 moles) was dissolved in water (517.16 g). To this was added a solution of manganese(II) chloride tetrahydrate ($MnCl_2.4H_2O$, 20.80 g, 0.1051 moles) in water (55 mL), followed by concentrated nitric acid ($HNO_3$, 69–71%, 59.34 g, 43 mL), rinsed in with water (21 mL). The resulting acidified metals solution was added slowly dropwise to the stirred solution of sodium carbonate, at room temperature. This addition was completed in about 2 hours; water (20 mL) was used to rinse the metals solution in at the end. Stirring at room temperature was continued for an additional 75 minutes.

The resulting purple slurry was suction-filtered (Buchner Funnel, Whatman Number 1 filter paper), and the solids were washed thoroughly with distilled water. A portion (8.3 g) of the filtered solids was reserved, and the remainder placed in an oven to dry at about 105° C. for about 12 hours yielding 110.1 g as a dark lumpy solid, which was sieved before subsequent calcination and evaluation.

The sample was evaluated using the established TG/DTA technique described above employing a calcination temperature of 206° C. The results are presented in Table 1 below and shown graphically in FIG. 1. The CoMn (10:1) catalyst was observed to be about three times more active than pure cobalt oxide when calcined at 206° C. The alumina control sample generated no heat, indicating no activity, as expected.

Figure 2:
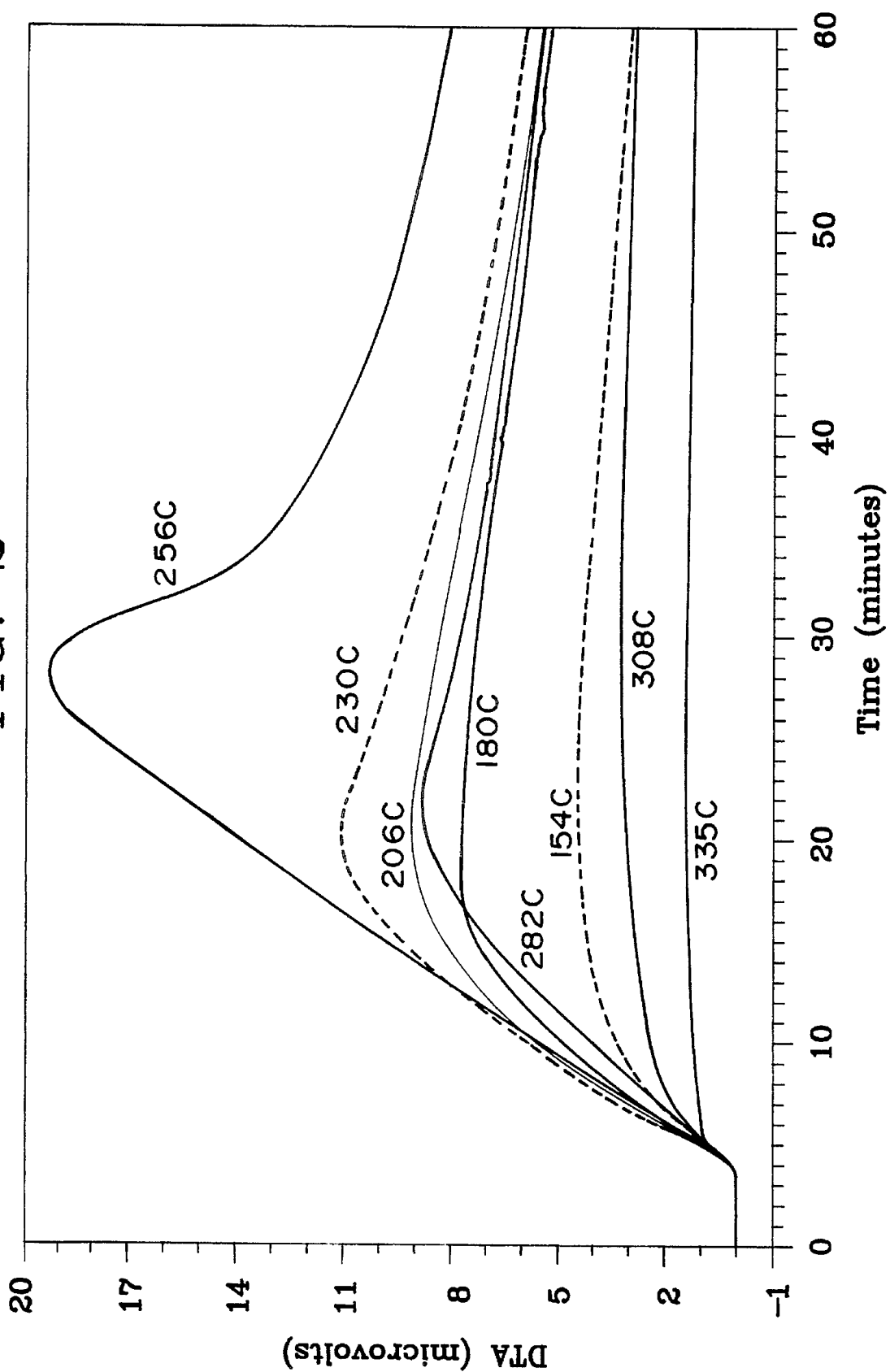
FIG. 2—Plot showing the ambient temperature CO oxidation activity in terms of DTA microvolts as a function of time for CoMn (10:1, Example 1) calcined at different temperatures.

The maximum DTA values, under ambient CO oxidation conditions, achieved as a function of calcination temperature for the CoMn (10:1) catalyst are presented in Table 2 and shown graphically in FIG. 2. This particular catalyst was observed to be most active after calcining at 256° (percent weight loss of 13.40). A temperature of about 154° C. (percent weight loss of 7.44) was shown to be insufficient to properly activating the catalyst, while temperatures of 308° C. and above were too high resulting in low activity at room temperature. For room temperature applications it should be emphasized that the optimum calcination temperature for the different cobalt-based catalysts is expected to be slightly different but fall within the temperature range of about 170° C. to 300° C.

Figure 3:
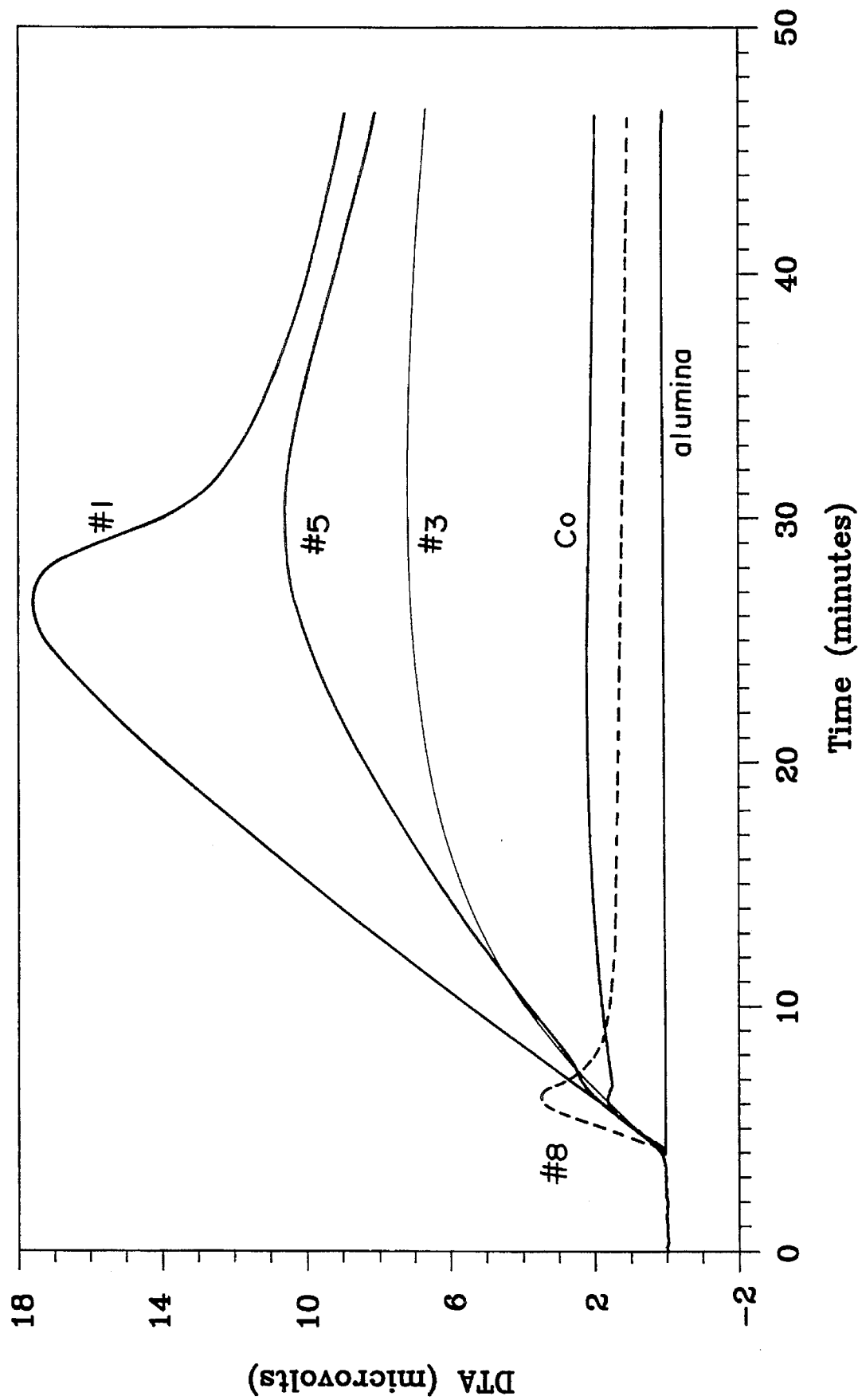
FIG. 3—Plot showing the ambient temperature CO oxidation activity in terms of DTA microvolts as a function of time for catalysts of Examples 1, 3, 5 and 8, Co oxide (Example 15), and alumina calcined at 256° C.
Figure 4:
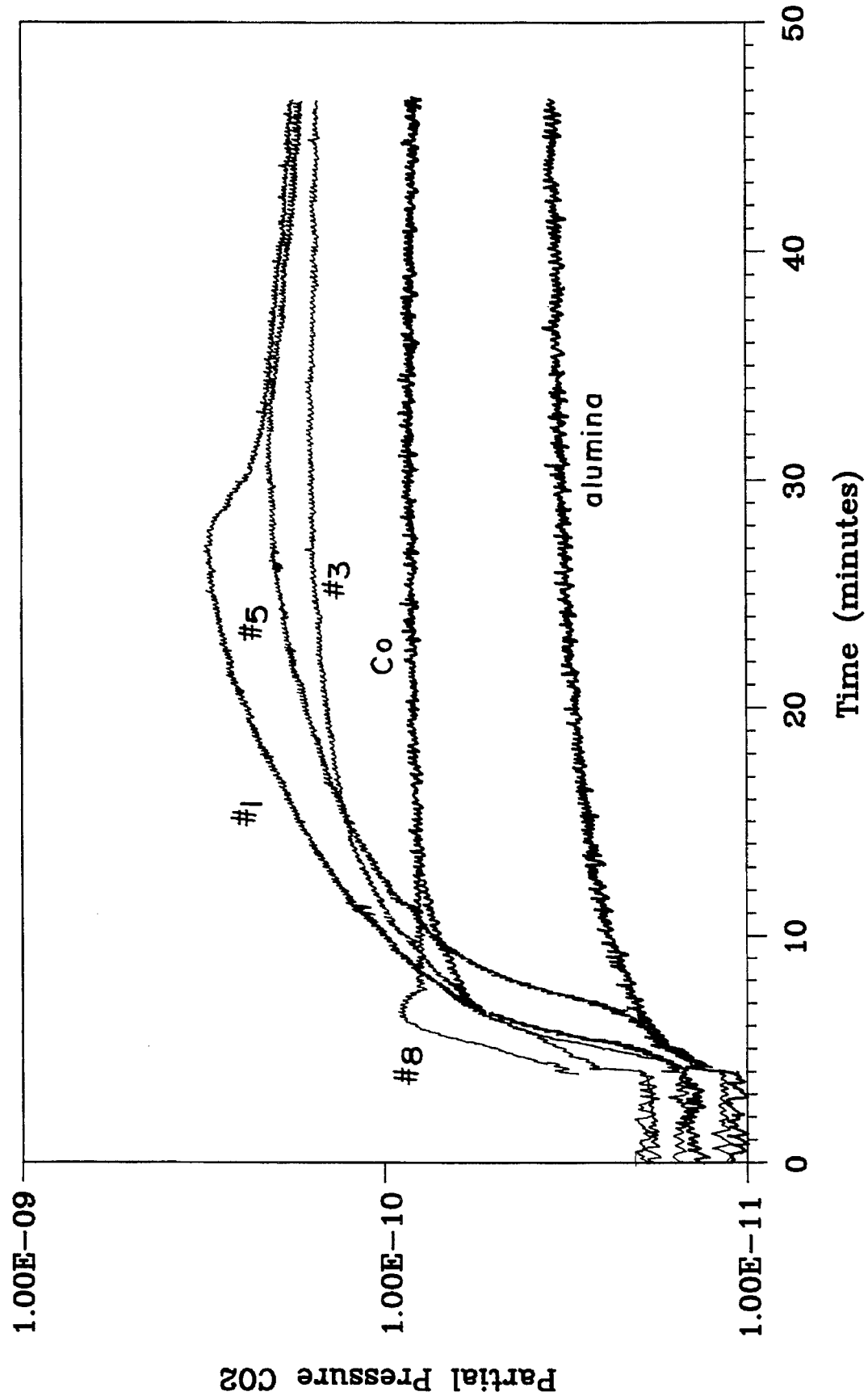
FIG. 4—Plot showing the ambient temperature CO oxidation activity in terms of $CO_2$ partial pressure as a function of time for catalysts of Examples 1, 3, 5 and 8, Co oxide (Example 15), and alumina calcined at 256° C.
Figure 5:
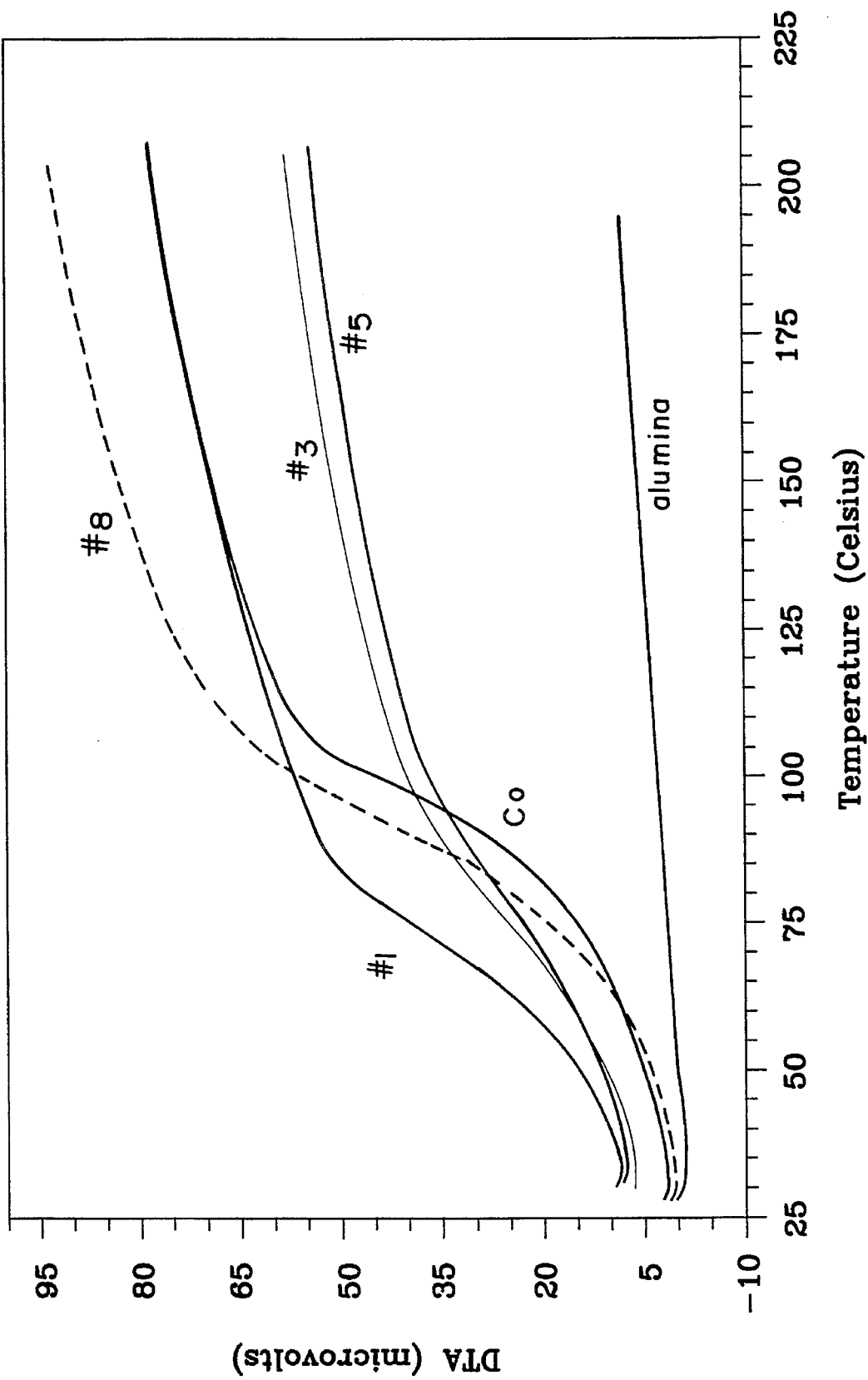
FIG. 5—Plot showing CO oxidation activity in terms of DTA microvolts as a function of temperature for catalysts of Examples 1, 3, 5 and 8, Co oxide (Example 15), and alumina calcined at 256° C. Prior to heating, catalysts were run for 45 minutes under ambient CO oxidation conditions as shown in FIG. 3.
Figure 6:
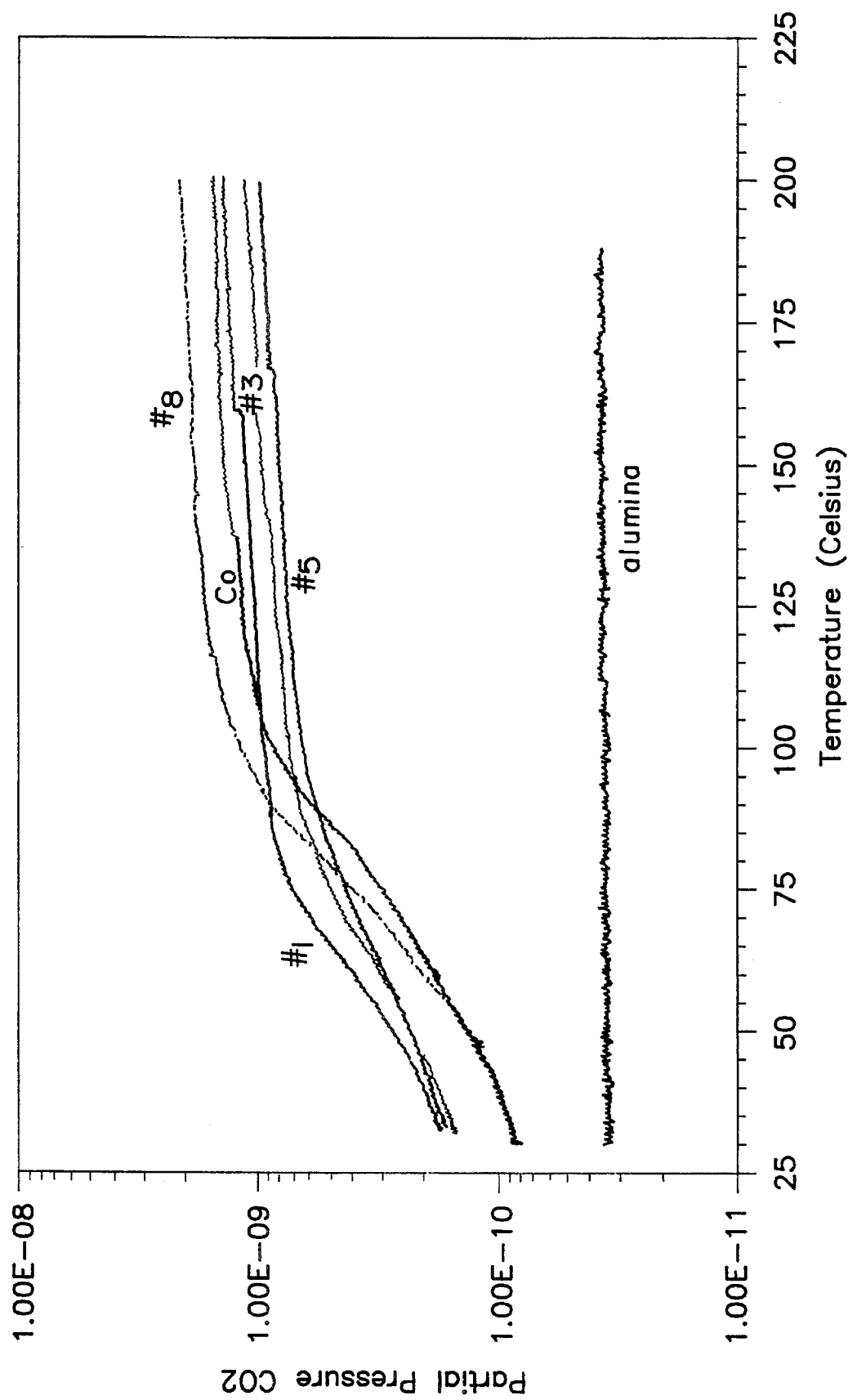
FIG. 6—Plot showing CO oxidation activity in terms of $CO_2$ partial pressure as a function of temperature for catalysts of Examples 1, 3, 5 and 8, Co oxide (Example 15), and alumina calcined at 256° C. Prior to heating, catalysts were run for 45 minutes under ambient CO oxidation conditions as shown in FIG. 4.

The CoMn (10:1) catalyst calcined at 256° C. was also evaluated using the established TG/DTA/MS technique described above. The results under adiabatic ambient conditions are presented in Table 3 and shown graphically in FIGS. 3 and 4. At this calcination temperature the CoMn (10:1) catalyst was observed to be about eight times more active than pure cobalt oxide. It was observed, as expected, that a direct correlation existed between the amount of heat generated (DTA) and the evolution of $CO_2$ (see FIGS. 3 and 4). FIGS. 5 and 6 show DTA and partial pressure $CO_2$, respectively, as the catalyst was heated in the TG/DTA balance at 10° C./min after having been exposed to ambient temperature CO oxidation conditions for 45 minutes (shown in FIGS. 3 and 4). It can be seen that the rate of CO oxidation over CoMn (10:1), as with all catalysts, increases with temperature.

Example 2

Preparation of Co/Mn (10:2) Oxide Catalyst Powder

This preparation closely followed the technique employed for Example 1. The following materials were used:
For the solution of base:
  $Na_2CO_3$ - 90.26 g in $H_2O$ - 590.03 g
For the solution of metals:
  $Co(NO_3)_2.6H_2O$ - 58.31 g in $H_2O$ - 129.45 g
  $Mn(NO_3)_2.6H_2O$ - 11.61 g in $H_2O$ - 41.49 g (for all transfers of solids and rinsings)
  $HNO_3$ - 11.88 g (8.5 mL)

The addition of the metals solution to the base was conducted over about an hour, after which the mixture was stirred for several hours. The mixture was then filtered and a dense, compact product obtained. The product was washed with distilled water, a sample (3.8 g) was reserved, and the remaining portion was placed in an oven to dry under the conditions of Example 1. The yield was 24.2 g.

The sample was evaluated using the established TG/DTA technique described above employing a calcination temperature of 206° C. The results are presented in Table 1 below and shown graphically in FIG. 1. The CoMn (10:2) catalyst was observed to be less active than the CoMn (10:1) catalyst.

Example 3

Preparation of Co/Mn/Fe (10:1:1) Oxide Catalyst Powder

The following materials were used:
For the solution of base:
  Na$_2$CO$_3$ - 90.56 g in H$_2$O - 589.58 g
For the solution of metals:
  CO(NO$_3$)$_2$.6H$_2$O - 58.40 g in H$_2$O - 130.67 g
to which was added:
  Mn(NO$_3$)$_2$.6H$_2$O - 5.81 g
  Fe(NO$_3$)$_3$9H$_2$O - 8.32 g
  HNO$_3$ - 8.2 mL (11.39 g)
  (Total water for all rinsings was 50.69 g.)

The metals addition was conducted over 2.3 hours, after which the solution was stirred for an additional half hour. The solution was then filtered and the resulting product was washed with distilled water. The solids (after reserving 2.9 g) were put into an oven to dry under the conditions of Example 1. The yield after sieving was 19.1 g of fairly durable black particles with a hint of brown.

The sample was evaluated using the established TG/DTA technique described above employing a calcination temperature of 206° C. The results are presented in Table 1 below and shown graphically in FIG. 1. The CoMnFe (10:1:1) catalyst was observed to be one of the most active catalysts when calcined at 206° C.

The CoMnFe (10:1:1) catalyst calcined at 256° C. was also evaluated using the established TG/DTA/MS technique described above. The results under adiabatic ambient conditions are presented in Table 3 and shown graphically in FIGS. 3 and 4. No significant difference was observed in catalytic activity between the CoMnFe (10:1:1) catalyst calcined at 256° C. versus that calcined at 206° C. FIGS. 5 and 6 show DTA and partial pressure CO$_2$, respectively, as the catalyst was heated in the TG/DTA balance at 10° C./min after having been exposed to ambient temperature CO oxidation conditions for 45 minutes (shown in FIGS. 3 and 4).

Example 4

Preparation of Co/Mn/Fe (10:2:2) Oxide Catalyst Powder
The following materials were used:
For the solution of base:
  Na$_2$CO$_3$ - 90.53 g in H$_2$0 - 591.87 g
For the solution of metals:
  CO(NO$_3$)$_2$.6H$_2$O - 58.26 g in H$_2$O - 130.28 g
to which was added:
  Mn(NO$_3$)$_2$.6H$_2$O - 11.51 g
  Fe(NO$_3$)$_3$9H$_2$O - 16.20 g
  HNO$_3$ - 8.2 mL (11.37 g) (added to Co solution before Mn or Fe)
  H$_2$O - 51.62 g, for all rinsings.

The metals addition was conducted over about an hour and a half, after which the solution was stirred for another hour. The solution was then filtered and the resulting product was washed with distilled water. The washed product (after reserving 3.8 g) was dried in an oven under the conditions of Example 1. The yield of the dried sample was 27.0 g.

The sample was evaluated using the established TG/DTA technique described above employing a calcination temperature of 206° C. The results are presented in Table 1 below and shown graphically in FIG. 1. The CoMnFe (10:2:2) catalyst was observed to be about half as active as the CoMnFe (10:1:1) catalyst.

Example 5

Preparation of Co/Mn/Ti (10:1:1) Oxide Catalyst Powder
Note: This procedure differed from the others in that special measures were needed to obtain a homogeneous solution containing titanium with the other metals. Titanium compounds tend to hydrolyze in water, forming insoluble oxides. Solution can be achieved by complexation, oxalic acid being one of the more effective chelating agents. Titanium chelates with oxalic acid seem to be compatible with the presence of cobalt or manganese, particularly when enough nitric acid is present to prevent the precipitation of their oxalates.

The following materials were used:
For the solution of base:
  Na$_2$CO$_3$ - 91.10 g in H$_2$O - 588.23 g
For the solution of metals:
  CO(NO$_3$)$_2$.6H$_2$O - 58.42 g in H$_2$O - 129.56 g
to which was added:
  Mn(NO$_3$)$_2$.6H$_2$O - 5.90 g
  HNO$_3$ - 8.2 mL (11.28 g)
  H$_2$O - 52 mL, for all rinsings.
To which was finally added the solution of titanium, just before the metals solution was scheduled to be added to the solution of base.
Preparation of H$_2$[TiO[C$_2$O$_{4-2}$]Solution
The titanium solution was prepared from:
  Titanium(IV) ethoxide - 4.68 g (20.51 mmoles)
  Oxalic acid dihydrate - 6.00 g (47.59 mmoles)
  Water - 72 mL.

The titanium mixture was stirred magnetically at ambient temperature (25° C.) until the gelatinous hydrated titanium oxides (resulting from the rapid hydrolysis of the titanium ethoxide as soon as this contacted water) had dissolved. [Note: although the ethanol produced by the hydrolysis can be removed by distillation, there is a risk of irreversible crystallization of titanium dioxide. Therefore, it is deemed prudent to tolerate the presence of ethanol, and not heat the solution of titanium oxalate before use.]

The metals addition was conducted over about two hours. The solution was allowed to sit overnight and was then filtered. The product was washed with distilled water and, after reserving 3.15 g, was dried in an oven under the conditions of Example 1. The yield of the dried portion was 24.2 g.

Figure 7:
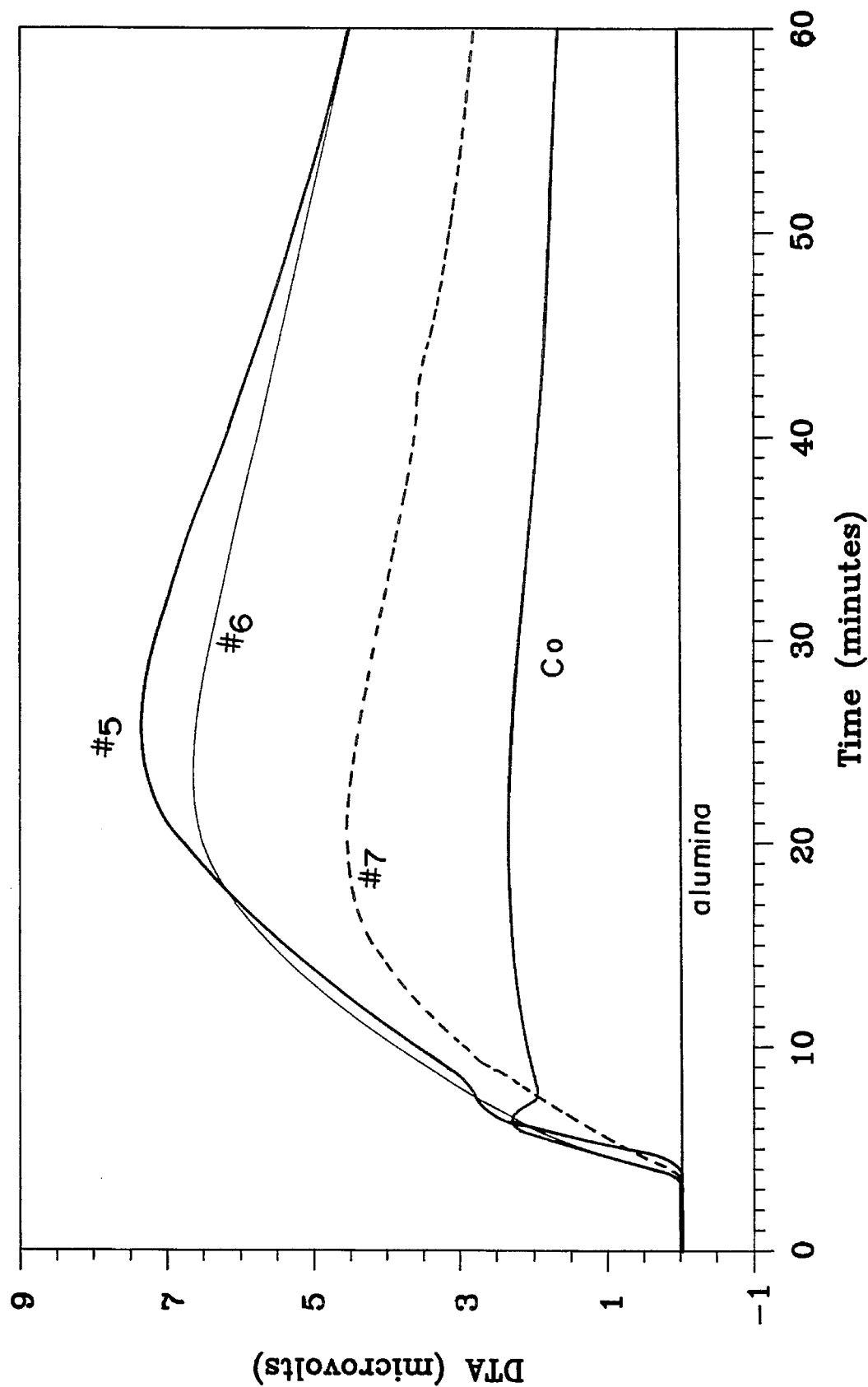
FIG. 7—Plot showing the ambient temperature CO oxidation activity in terms of DTA microvolts as a function of time for catalysts of Examples 5–7, Co oxide (Example 15), and alumina calcined at 206° C.

The sample was evaluated using the established TG/DTA technique described above employing a calcination temperature of 206° C. The results are presented in Table 1 below and shown graphically in FIG. 7. It should be noted that this catalyst composition was unique in its TG/DTA behavior, showing an inflection in the DTA curve in the first few minutes of reaction which was accompanied by a sharp increase in weight. In all other catalysts, a sharp increase in weight corresponded to a decline in activity.

The CoMnTi (10:1:1) catalyst calcined at 256° C. was also evaluated using the established TG/DTA/MS technique described above. The results under adiabatic ambient conditions are presented in Table 3 and shown graphically in FIGS. 3 and 4. Once again an inflection in DTA as well as CO$_2$ evolution curves are observed during the initial catalytic activity of CoMnTi (10:1:1). This catalyst was one of the most active at calcination temperatures of both 256° C. and 206° C. FIGS. 5 and 6 show DTA and partial pressure CO$_2$, respectively, as the catalyst was heated in the TG/DTA balance at 10° C./min after having been exposed to ambient temperature CO oxidation conditions for 45 minutes (shown in FIGS. 3 and 4).

Example 6

Preparation of Co/Mn/Al (10:1:1) Oxide Catalyst Powder
The following materials were used:
For the solution of base:

Na$_2$CO$_3$ - 90.32 g in H$_2$O - 591.46 g
For the solution of metals:
CO(NO$_3$)$_2$.6H$_2$O - 58.46 g in H$_2$O - 129.17 g
to which was added:
Mn(NO$_3$)$_2$.6H$_2$O - 5.80 g
Al(NO$_3$)$_3$.9H$_2$O - 7.60 g
H$_2$O - 42.95 g (43 mL) (total taken: to be used for all rinsings and solids transfers)
HNO$_3$ - 8.7 mL (12.11 g); H$_2$O - 4 mL of the above, for rinsings.

The metals addition was conducted over about an hour, after which the mixture was stirred for several hours. The mixture was then filtered and a product obtained. The product was washed with distilled water and after reserving a sample (5.0 g) the remaining portion was placed in an oven to dry under the conditions of Example 1. The yield was 23.2 g.

The sample was evaluated using the established TG/DTA technique described above employing a calcination temperature of 206° C. The results are presented in Table 1 below and shown graphically in FIG. 7.

Example 7

Preparation of Co/Mn/Cr (10:1:1) Oxide Catalyst Powder
The following materials were used:
For the solution of base:
Na$_2$CO$_3$ - 90.62 g in H$_2$O - 589.16 g (suction filtered, double thickness 5.5 cm Whatman #1)
For the solution of metals:
CO(NO$_3$)$_2$.6H$_2$O - 58.37 g in H$_2$O - 129.89 g
to which was added:
Mn(NO$_3$)$_2$.6H$_2$O - 5.79 g
Cr(NO$_3$)$_3$.9H$_2$O - 8.03 g
HNO$_3$ - 8.3 mL (11.58 g)
H$_2$O - 50.86 g, for all rinsings.

The metals addition was conducted over about two hours, after which the solution was stirred for about another hour and a half. The solution was then filtered and a product obtained. The product was washed with distilled water and then left under gravity filtration for about 12 hours. Washing was resumed the next morning, with the remainder of the 3 X 1000 mL water. The washed product (after reserving 2.81 g) was dried in an oven at about 105° C. for about 48 hours. The yield of dried product was 21.1 g.

The sample was evaluated using the established TG/DTA technique described above employing a calcination temperature of 206° C. The results are presented in Table 1 below and shown graphically in FIG. 7.

Example 8

Preparation of Co/Cu (10:1) Oxide Catalyst Powder
The following materials were used:
For the solution of base:
Na$_2$CO$_3$ - 90.33 g in H$_2$O - 593.04 g
For the solution of metals:
CO(NO$_3$)$_2$.6H$_2$O - 58.38 g in H$_2$O - 131.27 g
to which was added:
Cu(NO$_3$)$_2$.2.5H$_2$O - 4.68 g
HNO$_3$ - 8.1 mL ( 11.13 g )
H$_2$O - 15.5 mL, for all rinsings.

The metals addition was completed in 50 minutes. After 2 hours of stirring at room temperature, the mixture was filtered and the solids washed with distilled water. A sample (2.60 g) was reserved and the remainder was dried in an oven at about 105° C. for 3 days yielding 20.5 g.

Figure 8:
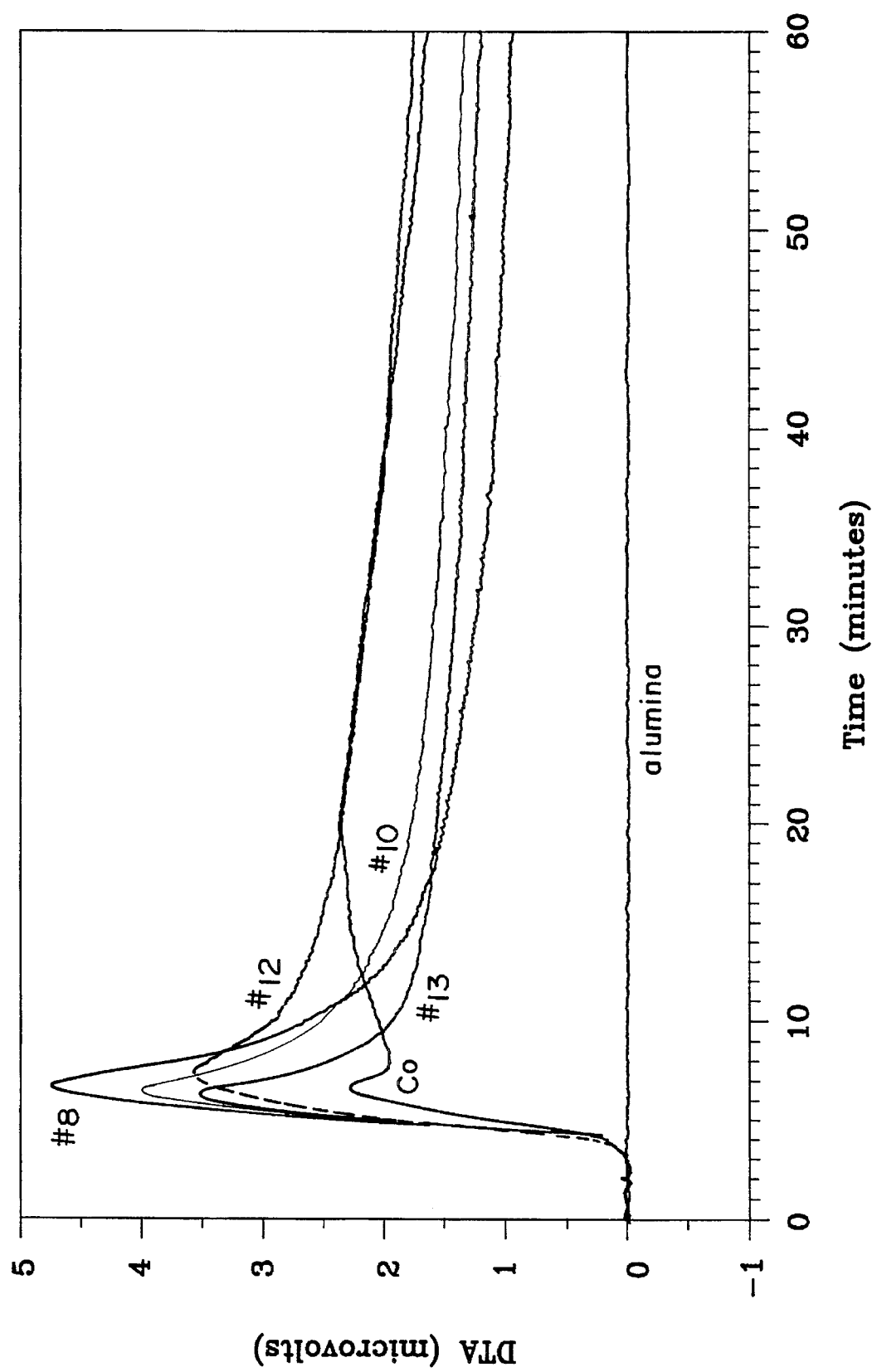
FIG. 8—Plot showing the ambient temperature CO oxidation activity in terms of DTA microvolts as a function of time for catalysts of Examples 8, 10, 12 and 13, Co oxide (Example 15), and alumina calcined at 206° C.

The sample was evaluated using the established TG/DTA technique described above employing a calcination temperature of 206° C. The results are presented in Table 1 below and shown graphically in FIG. 8 (Note Y-axis scale change versus FIGS. 1 and 7). It was observed that all non-manganese containing catalysts exhibited an initial sharp onset in activity followed by a faster decline than those catalysts containing manganese.

The CoCu (10:1) catalyst calcined at 256° C. was also evaluated using the established TG/DTA/MS technique described above. The results under adiabatic ambient conditions are presented in Table 3 and shown graphically in FIGS. 3 and 4. FIGS. 5 and 6 show DTA and partial pressure CO$_2$, respectively, as the catalyst was heated in the TG/DTA balance at 10° C./min after having been exposed to ambient temperature CO oxidation conditions for 45 minutes (shown in FIGS. 3 and 4). Of the catalysts tested at elevated CO oxidation temperatures (i.e., greater than 100° C.), CoCu (10:1) was observed to be the most active.

Example 9

Preparation of Co/Bi (10:1) Oxide Catalyst Powder
Note: due to the ease of hydrolysis of bismuth nitrate, pre-acidification of solutions to which it is to be added is recommended.
The following materials were used:
For the solution of base:
Na$_2$CO$_3$ - 90.60 g in H$_2$O - 589.42 g
For the solution of metals:
CO(NO$_3$)$_2$.6H$_2$O - 58.21 g in H$_2$O - 130.08 g
to which was added:
Bi(NO$_3$)$_3$.5H$_2$O - 9.76 g (added AFTER the nitric acid)
HNO$_3$ - 8.6 mL (12.09 g)
H$_2$O - 50.84 g, for all rinsings.
(Note: even with these levels of nitric acid, some basic bismuth nitrates separated out; these were not removed.)

The metals addition was completed in 2 hours. After 90 minutes of stirring at room temperature, the mixture was filtered and the solids washed with distilled water. A sample (3.2 g) was reserved and the remainder was dried in an oven overnight at about 105° C. yielding 21.6 g.

Figure 9:
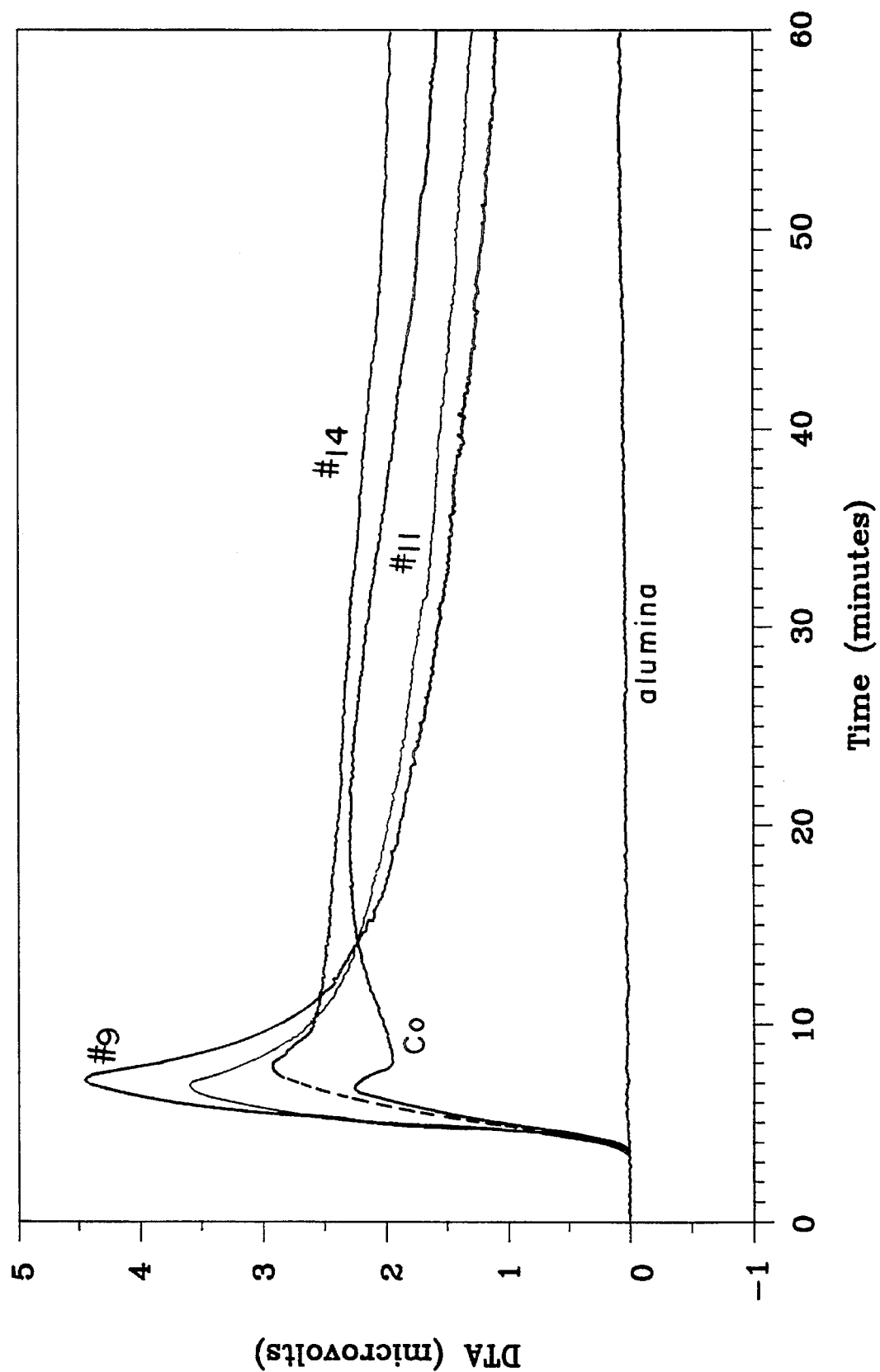
FIG. 9—Plot showing the ambient temperature CO oxidation activity in terms of DTA microvolts as a function of time for catalysts of Examples 9, 11 and 14, Co oxide (Example 15), and alumina calcined at 206° C.

The sample was evaluated using the established TG/DTA technique described above employing a calcination temperature of 206° C. The results are presented in Table 1 below and shown graphically in FIG. 9.

Example 10

Preparation of Co/Zn (10:1) Oxide Catalyst Powder
The following materials were used:
For the solution of base:
Na$_2$CO$_3$ - 90.08 g in H$_2$O - 590.61 g
For the solution of metals:
Co(NO$_3$)$_2$.6H$_2$O - 58.27 g in H$_2$O - 129.72 g
to which was added:
ZnCl$_2$ - 2.78 g
HNO$_3$ - 8.2 mL (11.28 g)
H$_2$O - 14.2 mL, for all rinsings.
The metals addition was completed in 2 hours. After 90 minutes of stirring at room temperature, the mixture was filtered and the solids washed with distilled water. A sample (2.5 g) was reserved and the remainder was dried in an oven overnight at about 105° C. yielding 21.25 g.

The sample was evaluated using the established TG/DTA technique described above employing a calcination temperature of 206° C. The results are presented in Table 1 below and shown graphically in FIG. 8.

Example 11

Preparation of Co/Mg (10:1) Oxide Catalyst Powder
The following materials were used:
For the solution of base:
  $Na_2CO_3$ - 90.11 g in $H_2O$ - 588.83 g
For the solution of metals:
  $Co(NO_3)_2.6H_2O$ - 58.24 g in $H_2O$ - 129.18 g
to which was added:
  $Mg(NO_3)_2.6H_2O$ - 5.15 g
  $HNO_3$ - 8.2 mL (11.40 g)
  $H_2O$ - 14 mL, for all rinsings.

The metals addition was completed in 42 minutes. After 90 minutes of stirring at room temperature, the mixture was filtered and the solids washed with distilled water. A sample (3.5 g) was reserved and the remainder was dried in an oven overnight at about 105° C. yielding 18.07 g.

The sample was evaluated using the established TG/DTA technique described above employing a calcination temperature of 206° C. The results are presented in Table 1 below and shown graphically in FIG. 9.

Example 12

Preparation of Co/Ce (10:1) Oxide Catalyst Powder
The following materials were used:
For the solution of base:
  $Na_2CO_3$ 90.90 g in $H_2O$ - 588.42 g
For the solution of metals:
  $Co(NO_3)_2.6H_2O$ - 58.43 g in $H_2O$ - 99.52 g
to which was added:
  $(NH_4)_2Ce(NO_3)_6$ - 10.97 g
  $HNO_3$ - 8.3 mL (11.34 g)
  $H_2O$ - 50.51 g, for all rinsings.

The metals addition was completed in 143 minutes. After standing overnight at room temperature, the mixture was filtered and the solids washed with distilled water. (The filtrates were unusual, in that they were a light yellow, instead of the usual pinkish-purple.) A sample (3.1 g) was reserved and the remainder was dried in an oven overnight at about 105° C. yielding 20.3 g.

The sample was evaluated using the established TG/DTA technique described above employing a calcination temperature of 206° C. The results are presented in Table 1 below and shown graphically in FIG. 8.

Example 13

Preparation of Co/La (10:1) Oxide Catalyst Powder
The following materials were used:
For the solution of base:
  $Na_2CO_3$ - 90.49 g in $H_2O$ - 589.95 g
For the solution of metals:
  $CO(NO_3)_2.6H_2O$ - 58.21 g in $H_2O$ - 129.29 g
to which was added:
  $La(NO_3)_3.6H_2O$ - 8.75 g
  $HNO_3$ - 8.65 mL (11.98 g)
  $H_2O$ - 53.11 g, for all rinsings.

The metals addition was completed in 50 minutes. After standing for 90 minutes at room temperature, the mixture was filtered and the solids washed with distilled water. A sample (3.2 g) was reserved and the remainder was dried in an oven overnight at about 105° C. yielding 24.12 g.

The sample was evaluated using the established TG/DTA technique described above employing a calcination temperature of 206° C. The results are presented in Table 1 below and shown graphically in FIG. 8.

Example 14

Preparation of Co/Zr (10:1) Oxide Catalyst Powder
The following materials were used:
For the solution of base:
  $Na_2CO_3$ - 90.22 g in $H_2O$ - 589.64 g
For the solution of metals:
  $CO(NO_3)_2.6H_2O$ - 58.24 g in $H_2O$ - 130.02 g
to which was added:
  $ZrOCl_2.8H_2O$ - 6.45 g
  $HNO_3$ - 8.1 mL (11.34 g)
  $H_2O$ - 24–34 mL, for all rinsings.

The metals addition was completed in 60 minutes. After stirring for an hour, and then after standing for a further hour at room temperature, the mixture was filtered and the solids washed with distilled water. A sample (2.7 g) was reserved and the remainder was dried in an oven for five days at about 105° C. yielding 18.2 g.

The sample was evaluated using the established TG/DTA technique described above employing a calcination temperature of 206° C. The results are presented in Table 1 below and shown graphically in FIG. 9.

Example 15

Comparative Co Oxide Sample

Preparation of Co Oxide

The following materials were used:
  $Na_2CO_3$ - 90.46 g; $H_2O$ - 591.22 g
  $CO(NO_3)_2.6H_2O$ - 70.25 g; $H_2O$ - 134.16 g
  $HNO_3$ - 8.3 mL (11.81 g); $H_2O$—Total water for all rinsings was 50.95 g.

The metals addition was completed in about two hours, after which the solution was stirred for an additional 0.5 hours. The solution was then filtered and the resulting product was washed with distilled water and allowed to drain for about 12 hours. A sample (4.9 g) was reserved and the remainder was dried in an oven overnight at about 105° C. yielding 17.5 g.

The sample was evaluated using the established TG/DTA technique described above employing a calcination temperature of 206° C. The results are presented in Table 1 below and shown graphically in FIGS. 1, 7, 8, and 9. The pure cobalt oxide sample was observed to exhibit a unique DTA curve containing components of catalysts containing manganese and those that do not.

The Co oxide catalyst calcined at 256° C. was also evaluated using the established TG/DTA/MS technique described above. The results under adiabatic ambient conditions are presented in Table 3 and shown graphically in FIGS. 3 and 4. FIGS. 5 and 6 show DTA and partial pressure $CO_2$, respectively, as the catalyst was heated in the TG/DTA balance at 10° C./min after having been exposed to ambient temperature CO oxidation conditions for 45 minutes (shown in FIGS. 3 and 4). The pure cobalt oxide catalyst was observed to be quite active at higher CO oxidation temperatures (i.e., above 100° C.).

TABLE 1

| CO Oxidation Activity of Catalysts Calcined at 206° C. | | |
|---|---|---|
| Example # | Metal Composition (of oxides) | DTA Maximum (μ volts) | Figure Reference |
| 1 | CoMn - 10:1 | 6.30 | 1 |
| 2 | CoMn - 10:2 | 5.35 | 1 |

TABLE 1-continued

CO Oxidation Activity of Catalysts Calcined at 206° C.

| Example # | Metal Composition (of oxides) | DTA Maximum (μ volts) | Figure Reference |
|---|---|---|---|
| 3 | CoMnFe - 10:1:1 | 8.05 | 1 |
| 4 | CoMnFe - 10.2:2 | 4.20 | 1 |
| 5 | CoMnTi - 10:1:1 | 7.30 | 7 |
| 6 | CoMnAl - 10:1:1 | 6.50 | 7 |
| 7 | CoMnCr - 10:1:1 | 4.55 | 7 |
| 8 | CoCu - 10:1 | 4.80 | 8 |
| 9 | CoBi - 10:1 | 4.50 | 9 |
| 10 | CoZn - 10:1 | 4.05 | 8 |
| 11 | CoMg - 10:1 | 3.70 | 9 |
| 12 | CoCe - 10:1 | 3.65 | 8 |
| 13 | CoLa - 10:1 | 3.60 | 8 |
| 14 | CoZr - 10:1 | 2.95 | 9 |
| 15 | Co - neat | 2.35 | 1,7,8,9 |

TABLE 2

CO Oxidation Activity of CoMn (10:1) as a Function of Calcination Temperature

| Calcination Temperature (°C.) | Calcination % Weight Loss | CO Oxidation DTA Maximum (μ V) | Figure Reference |
|---|---|---|---|
| 154 | 7.44 | 4.69 | 2 |
| 180 | 9.18 | 8.08 | 2 |
| 206 | 12.02 | 9.51 | 2 |
| 230 | 12.47 | 11.57 | 2 |
| 256 | 13.40 | 19.33 | 2 |
| 282 | 16.21 | 9.27 | 2 |
| 308 | 17.18 | 3.48 | 2 |
| 335 | 12.85 | 1.62 | 2 |

TABLE 3

CO Oxidation Activity of Catalysts Calcined at 256° C.

| Example # | Metal Composition (of oxides) | DTA Maximum (μ volts) | $CO_2$ Maximum (partial pressure) | Figure Reference |
|---|---|---|---|---|
| 1 | CoMn - 10:1 | 17.60 | 3.00 E-10 | 3 and 4 |
| 3 | CoMnFe - 10:1:1 | 7.10 | 1.55 E-10 | 3 and 4 |
| 5 | CoMnTi - 10:1:1 | 10.50 | 2.05 E-10 | 3 and 4 |
| 8 | CoCu - 10:1 | 3.50 | 9.00 E-11 | 3 and 4 |
| 15 | Co - neat | 2.20 | 8.80 E-11 | 3 and 4 |
| control | alumina | 0.15 | 3.50 E-11 | 3 and 4 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A mixed-metal oxide catalyst composition comprising an amorphous intimate mixture of an oxide of cobalt in a principal amount and lesser amounts of one or more oxides of metals selected from the group consisting of manganese, aluminum, bismuth, cerium, chromium, copper, iron, lanthanum, magnesium, titanium, zinc, and zirconium, the amorphous intimate mixture catalyst composition being obtained by calcining in an oxygen-containing atmosphere at a temperature of about 150° C. to about 290° C.

2. The catalyst composition of claim 1, wherein the atomic ratio of cobalt to other metals is from about 50:1 to about 2:1.

3. A quaternary oxide catalyst composition comprising an amorphous intimate mixture of an oxide of cobalt in a principal amount and lesser amounts of oxides of three metals selected from the group consisting of Mn, Al, Bi, Ce, Cr, Cu, Fe, La, Mg, Ti, Zn, and Zr, the amorphous intimate mixture catalyst composition being obtained by calcining in an oxygen-containing atmosphere at a temperature of about 150° C. to about 290° C.

4. The catalyst composition of claim 3, wherein the atomic ratio of cobalt to the other three metals is from about 50:1 to about 2:1.

5. A quaternary oxide catalyst composition comprising an amorphous intimate mixture of an oxide of cobalt in a principal amount with lesser amounts of manganese and oxides of two metals selected from the group consisting of Al, Bi, Ce, Cr, Cu, Fe, La, Mg, Ti, Zn, and Zr, the amorphous intimate mixture catalyst composition being obtained by calcining in an oxygen-containing atmosphere at a temperature of about 150° C. to about 290° C.

6. The catalyst composition of claim 5, wherein the atomic ratio of cobalt to manganese is from about 20:1 to about 5:1.

7. The catalyst composition of claim 6, wherein the atomic ratio of cobalt to the other two metals is from about 50:1 to about 5:1.

8. A ternary oxide catalyst composition comprising an amorphous intimate mixture of an oxide of cobalt in a principal amount and lesser amounts of oxides of two metals selected from the group consisting of Mn, Al, Bi, Ce, Cr, Cu, Fe, La, Mg, Ti, Zn, and Zr, the amorphous intimate mixture catalyst composition being obtained by calcining in an oxygen-containing atmosphere at a temperature of about 150° C. to about 290° C.

9. The catalyst composition of claim 8, wherein the metals are manganese and titanium.

10. The catalyst composition of claim 8, wherein the metals are manganese and iron.

11. The catalyst composition of claim 8, wherein the metals are manganese and aluminum.

12. The catalyst composition of claim 8, wherein the metals are manganese and chromium.

13. The catalyst composition of claim 10, wherein the atomic ratio of cobalt to the other two metals is from about 50:1 to about 2:1.

14. A ternary oxide catalyst composition comprising an amorphous intimate mixture of an oxide of cobalt in a principal amount with lesser amounts of manganese and oxides of one other metal selected from the group consisting of Al, Bi, Ce, Cr, Cu, Fe, La, Mg, Ti, Zn, and Zr, the amorphous intimate mixture catalyst composition being obtained by calcining in an oxygen-containing atmosphere at a temperature of about 150° C. to about 290° C.

15. The catalyst composition of claim 14, wherein the atomic ratio of cobalt to manganese is from about 20:1 to about 5:1.

16. The catalyst composition of claim 15, wherein the atomic ratio of cobalt to the other metal is from about 50:1 to about 5:1.

17. The catalyst composition of claim 16, wherein the metal is Al.

18. The catalyst composition of claim 16, wherein the metal is Fe.

19. The catalyst composition of claim 16, wherein the metal is Ti.

20. A binary oxide catalyst composition comprising an amorphous intimate mixture of an oxide of cobalt in a principal amount and lesser amounts of oxides of one other metal selected from the group consisting of Mn, Al, Bi, Ce, Cr, Cu, Fe, La, Mg, Ti, Zn, and Zr, the amorphous intimate mixture catalyst composition being obtained by calcining in an oxygen-containing atmosphere at a temperature of about 150° C. to about 290° C.

21. The catalyst composition of claim 20, wherein the atomic ratio of cobalt to the other metal is from about 50:1 to about 2:1.

22. The catalyst composition of claim 21, wherein the metal is copper.

23. The catalyst composition of claim 21, wherein the metal is manganese.

24. The catalyst composition of claim 21, wherein the metal is bismuth.

25. The catalyst composition of claim 21, wherein the metal is zinc.

26. The catalyst composition of claim 21, wherein the metal is magnesium.

27. The catalyst composition of claim 21, wherein the metal is lanthanum.

28. The catalyst composition of claim 21, wherein the metal is cerium.

29. The catalyst composition of claim 21, wherein the metal is iron.

30. The catalyst composition of claim 21, wherein the metal is zirconium.

31. The catalyst composition of claim 21, wherein the metal is titanium.

32. The catalyst composition of claim 21, wherein the metal is chromium.

33. The catalyst composition of claim 21, wherein the metal is aluminum.

34. A catalyst composition according to any one of claims 1–33, further comprising support material upon which the mixed-metal oxide is deposited.

35. The catalyst of claim 34, wherein the support material is at least one material selected from the group consisting of ceramic, zeolite, porous carbon, porous paper, and metal mesh.

36. An air purification system including a catalyst composition according to any one of claims 1–33.

37. A vehicle exhaust gas catalyst including a catalyst composition according to any one of claims 1–33.

38. A method for producing an amorphous intimate mixture of a mixed-metal oxide catalyst composition comprising:

a. mixing a salt of cobalt with a salt of at least one metal selected from the group consisting of Mn, Al, Bi, Ce, Cr, Cu, Fe, La, Mg, Ti, Zn, and Zr in aqueous solution to form a mixture;

b. coprecipitating the metal salts by adding the mixture to a base to form a precipitate;

c. washing the precipitate;

d. drying the washed precipitate; and e. calcining the dried precipitate in an oxygen-containing atmosphere at a temperature of about 150° C. to about 290° C.

39. The method of claim 38, wherein the base is selected from the group consisting of sodium carbonate, potassium carbonate, sodium bicarbonate, and potassium bicarbonate.

40. An air purification system including a catalyst composition according to claim 34.

41. A vehicle exhaust gas catalyst including a catalyst composition according to claim 34.

42. A catalyst composition produced by the method of claim 38.

43. A method of catalyzing the oxidation of carbon monoxide which comprises heating a material containing carbon monoxide in the presence of a catalyst composition according to any one of claims 1–33.

44. A method of catalyzing the oxidation of volatile organic materials which comprises heating a material containing volatile organic materials in the presence of a catalyst composition according to any one of claims 1–33.

\* \* \* \* \*